United States Patent
Jager et al.

(10) Patent No.: US 10,671,101 B2
(45) Date of Patent: Jun. 2, 2020

(54) ASSEMBLY FOR MANUFACTURING A CARTRIDGE FOR REGULATING THE MIXTURE OF COLD AND HOT FLUIDS

(71) Applicant: VERNET, Ollainville (FR)

(72) Inventors: Frédéric Jager, Saint-Cheron (FR); Cédric Mollard, Breuillet (FR)

(73) Assignee: VERNET, Ollainville (FR)

( * ) Notice: Subject to any disclaimer, the term of this patent is extended or adjusted under 35 U.S.C. 154(b) by 112 days.

(21) Appl. No.: 16/076,494

(22) PCT Filed: Feb. 7, 2017

(86) PCT No.: PCT/EP2017/052587
§ 371 (c)(1),
(2) Date: Aug. 8, 2018

(87) PCT Pub. No.: WO2017/137368
PCT Pub. Date: Aug. 17, 2017

(65) Prior Publication Data
US 2019/0050006 A1    Feb. 14, 2019

(30) Foreign Application Priority Data
Feb. 8, 2016    (FR) ..................................... 16 50966

(51) Int. Cl.
*G05D 23/13*    (2006.01)
(52) U.S. Cl.
CPC ................................ *G05D 23/1353* (2013.01)
(58) Field of Classification Search
CPC .... G05D 23/08; G05D 23/13; G05D 23/1306; G05D 23/132; G05D 23/1353
See application file for complete search history.

(56) References Cited

U.S. PATENT DOCUMENTS

| 5,340,018 A | * | 8/1994 | MacDonald | ....... | G05D 23/1353 |
| | | | | | 236/12.2 |
| 2019/0294185 A1 | * | 9/2019 | Fassolette | .......... | G05D 23/1353 |

FOREIGN PATENT DOCUMENTS

| EP | 1 241 385 A1 | 9/2002 |
| WO | WO 2015/086749 A1 | 6/2015 |

OTHER PUBLICATIONS

French Search Report, dated Oct. 24, 2016, in French Application No. 1650966.

(Continued)

*Primary Examiner* — Marc E Norman
(74) *Attorney, Agent, or Firm* — Knobbe, Martens, Olson & Bear, LLP

(57) ABSTRACT

An assembly for manufacturing a cartridge for regulating cold and hot fluids to be mixed, includes a pre-assembled base module, with a base, which encloses a mixing chamber with first and second inlets, for a cold fluid and for a hot fluid, respectively, and an outlet for a mixture of the cold and hot fluids, a slide, which is movable in the chamber so as to inversely vary a flow of the hot and cold fluids, and a thermostatic actuator arranged in the chamber, which moves the slide to a position corresponding to a pre-set temperature for the mixture. The assembly has at least two specific modules from among a single-control module, a sequential module and a dual-control module, each module being pre-assembled and including a housing suitable for being attached to the base, and an adjustment member movably mounted in the housing.

12 Claims, 5 Drawing Sheets

(56) References Cited

OTHER PUBLICATIONS

International Search Report (ISR) & Written Opinion, dated May 8, 2017, in International Application No. PCT/EP2017/052587.

\* cited by examiner

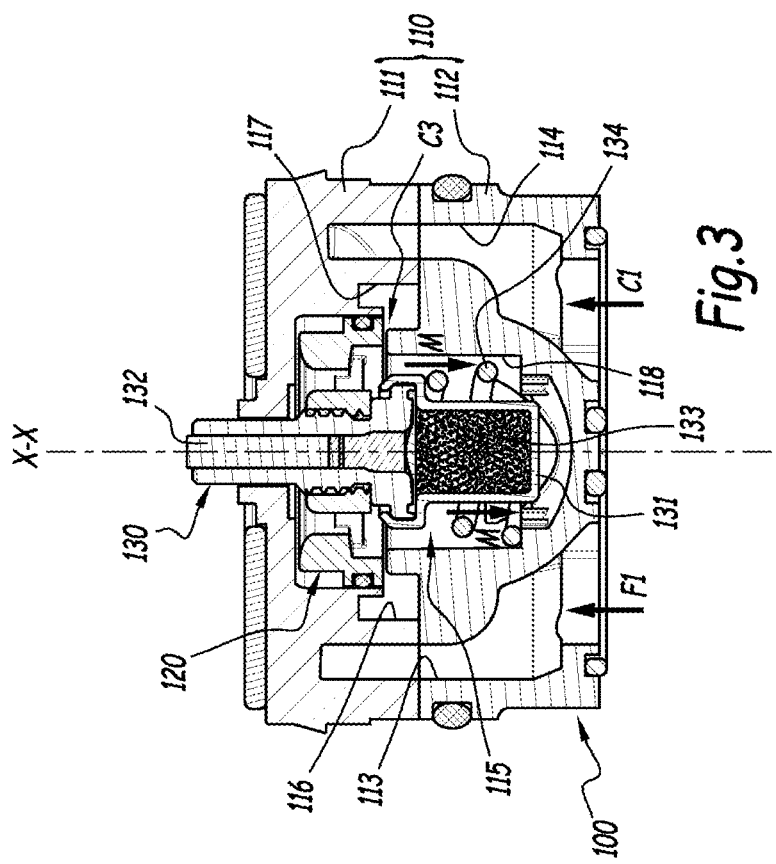
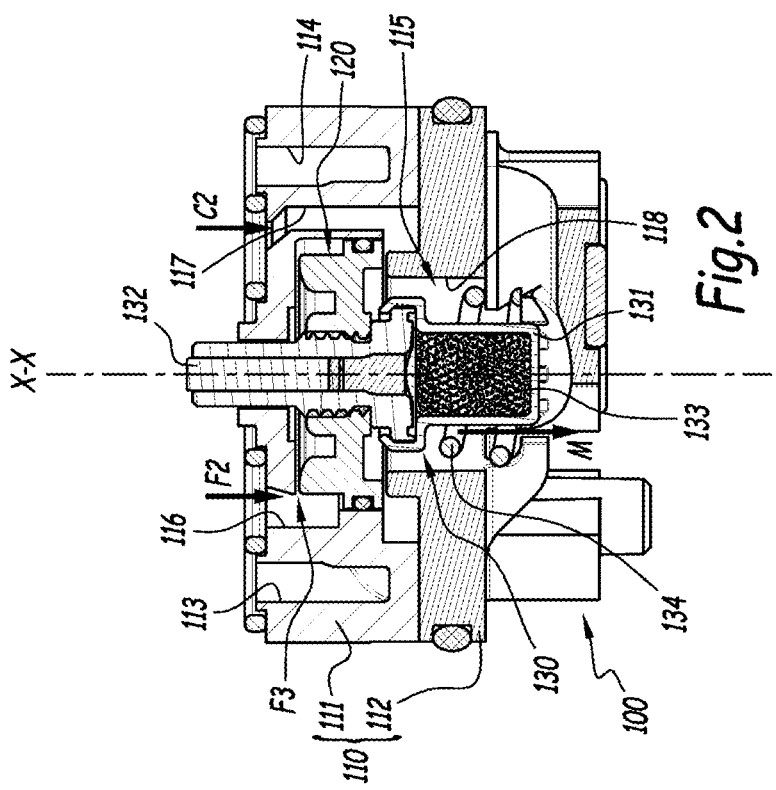

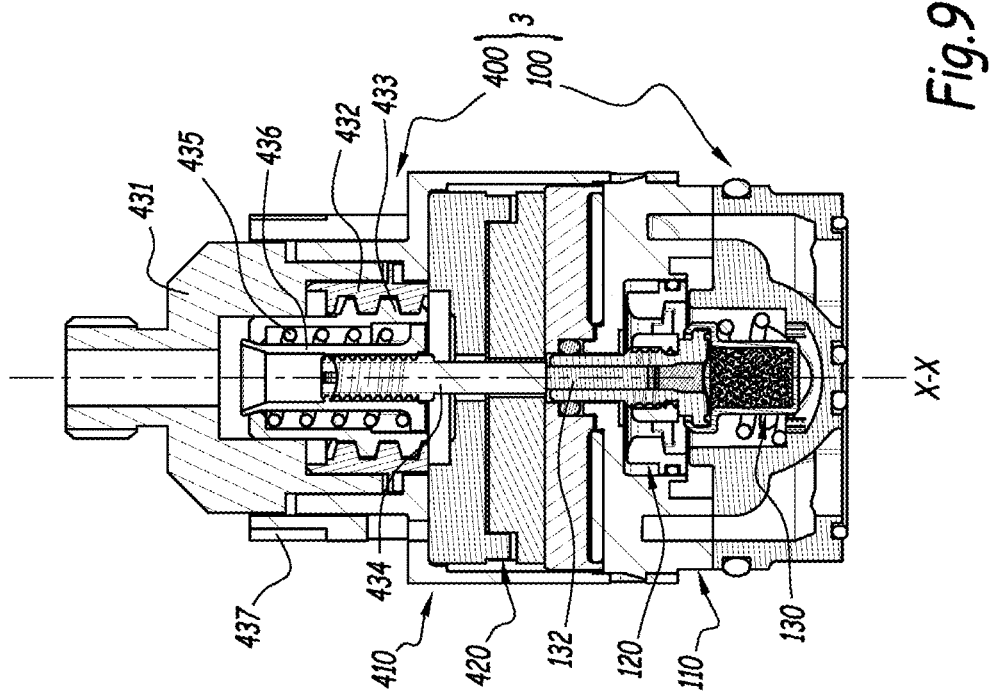
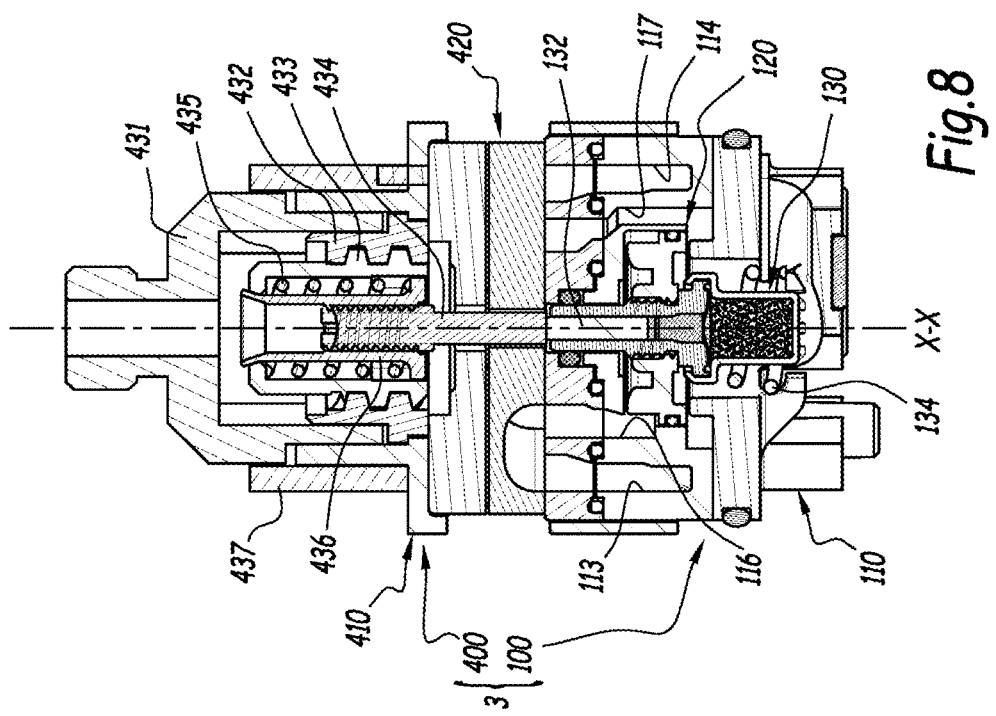

ASSEMBLY FOR MANUFACTURING A CARTRIDGE FOR REGULATING THE MIXTURE OF COLD AND HOT FLUIDS

PRIORITY AND CROSS REFERENCE TO RELATED APPLICATIONS

This application is the U.S. National Phase Application under 35 U.S.C. § 371 of International Application No. PCT/EP2017/052587, filed Feb. 7, 2017, designating the U.S. and published as WO 2017/137368 A1 on Aug. 17, 2017, which claims the benefit of French Application No. FR 1650966, filed Feb. 8, 2016. Any and all applications for which a foreign or a domestic priority is claimed is/are identified in the Application Data Sheet filed herewith and is/are hereby incorporated by reference in their entireties under 37 C.F.R. § 1.57.

FIELD

The present invention relates to a device for mixing fluids.

SUMMARY

The present invention relates to an assembly for manufacturing a cartridge for regulating cold and hot fluids to be mixed.

BRIEF DESCRIPTION OF THE DRAWINGS

The invention will be better understood upon reading the following description, provided solely as an example and done in reference to the drawings, in which:

FIGS. 2 and 3 are longitudinal sectional views, in respective planes orthogonal to one another, of a base module belonging to the assembly of FIG. 1;

FIGS. 6 and 7 and FIGS. 8 and 9 are views similar to FIGS. 4 and 5, respectively, and respectively illustrate the assembly of the base module with two other respective modules of the assembly of FIG. 1.

DETAILED DESCRIPTION

Figure 1:
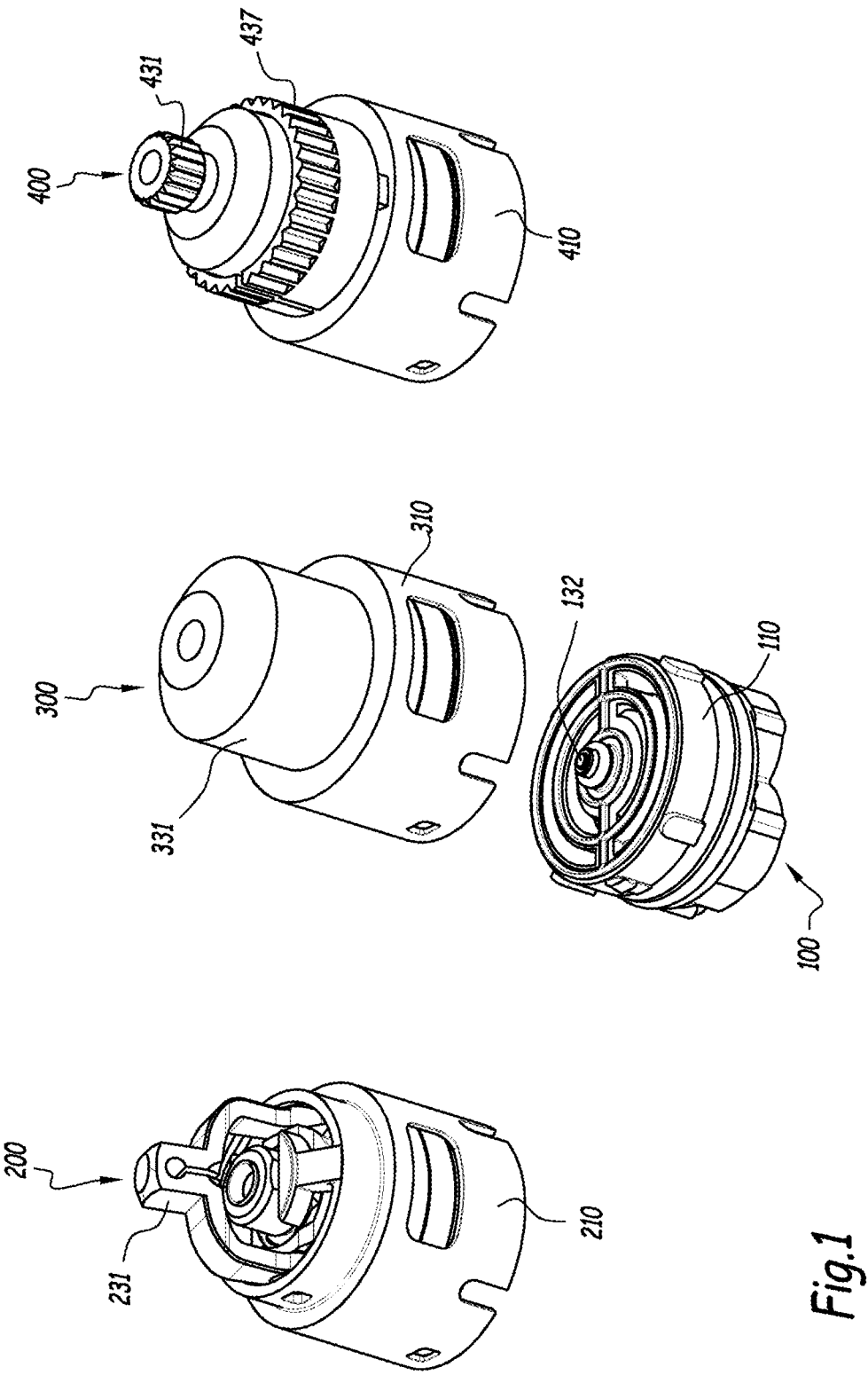
FIG. 1 is a perspective view of a manufacturing assembly according to the invention.

The present invention relates to an assembly for manufacturing a cartridge for regulating cold and hot fluids to be mixed.

In the sanitation field, a cartridge is a device making it possible to regulate hot and cold fluids to be mixed, in particular hot water and cold water.

The cartridge is described as thermostatic when it incorporates a thermostatic actuator, in particular a thermostatic element that comprises a first part, which is normally stationary relative to a hollow base of the cartridge, and a second part, which is movable along an axis of the base relative to the first part under the effect of the temperature applied to the actuator, for example under the action of the expansion of a thermo-expansive material contained in the thermostatic element. The second part of the thermostatic actuator is provided to be integral with a slide valve movable along the axis inside the base of the cartridge so as to inversely vary the passage flow sections of the hot and cold fluids in the base, in order to mix those two fluids in variable proportions to obtain, downstream from the slide valve, a fluid, called blended fluid, mixture or mixed fluid, that flows along a heat-sensitive region of the thermostatic element and leaves the base. By modifying the position of the first part of the thermostatic actuator relative to the base, using an ad hoc control mechanism, the control temperature around which the temperature of the mixture is thus controlled by the slide valve is varied.

Furthermore, to vary the cold fluid flow rate and the hot fluid flow rate sent to the slide valve via the base, the cartridge incorporates an adjusting member, such as a set of ceramic discs, that is mounted so as to be at least partially movable in a body fastened to the base.

Such a thermostatic cartridge can be broken down into several types depending on how the flow rate and the temperature of the mixture leaving the cartridge are controlled. Thus, the cartridge is said to be single control when the flow rate in the temperature of the mixture are controlled jointly, subject to continuous actuation with one another the aforementioned adjusting member, making it possible to adjust the cold fluid and hot fluid flow rates sent to the slide valve via the base, and the aforementioned control mechanism, making it possible to modify the position of the thermostatic actuator. WO-A-2015/086749 provides an example of such a single control cartridge. When the flow rate of the mixture and the temperature of the mixture are controlled separately from one another, subject to independent actuations of the aforementioned adjusting member and control mechanism, the cartridge is referred to as dual control. EP-A-1,241,385 provides an example of such a dual control cartridge. The cartridge can also be referred to as sequential when the flow rate and the temperature of the mixture are controlled successively, subject first to actuating the adjusting member without actuating the control mechanism, then jointly actuating the adjusting element and the control mechanism.

It is understood that each type of thermostatic cartridge satisfies specific specifications and is subject to specific arrangements, in particular seeking to optimize the regulation performance and the maximum acceptable flow rates. In terms of the manufacturing of said cartridges, this leads to specificities in terms of design, assembly and selection of the components of each type of cartridge. In other words, each type of cartridge requires its own specific technical and financial investments, which, for a given market player, involves substantial costs to offer several types of cartridge at once.

The present invention aims to seek to provide a range of several types of thermostatic cartridge at lower investments.

To that end, the invention relates to an assembly for manufacturing a cartridge for regulating cold and hot fluids to be mixed said assembly comprising:

a base module, including:
  a base, which defines a main axis and which contains a chamber for mixing cold and hot fluids, said chamber being connected to the outside of the base by both first and second inlets, for the cold fluid and for the hot fluid, respectively, and an outlet for a mixture of the cold and hot fluids,
  a slide valve that is movable parallel to the main axis inside the chamber so as to vary inversely the respective flow sections of a first passage, supplied by the first inlet, and a second passage, supplied by the second inlet, and
  a thermostatic actuator, which is at least partly arranged in the chamber and which, based on the temperature of the mixture, moves the slide valve inside the chamber up to a regulating position corresponding to a control temperature that is defined by the axial position of a dedicated part of the thermostatic actuator; and at least two specific modules from among a single control module, a sequential module and a dual control module, each of said single control, sequential and dual control modules including:

a case that is suitable for being fastened to the base of the base module, and an adjusting member that is mounted in the case at least partially movably so as, when the case is fastened to the base, to vary the flow rate of the cold fluid, sent to the first inlet, and the flow rate of the hot fluid, sent to the second inlet, the single control module further including a control mechanism, which, when its case is fastened to the base, is suitable for jointly controlling the flow rate and the temperature of the mixture by providing for driving its adjusting member and the dedicated part of the thermostatic actuator continuously with one another, the sequential module further including a control mechanism, which, when its case is fastened to the base, is suitable for successively controlling the flow rate and the temperature of the mixture by first providing for driving its adjusting member without the dedicated part of the thermostatic actuator, then driving its adjusting member and the dedicated part of the thermostatic actuator together, and the dual control module further including a control mechanism, which, when its case is fastened to the base, is suitable for separately controlling the flow rate and the temperature of the mixture by providing for driving its adjusting member and the dedicated part of the thermostatic actuator independently of one another;

wherein each of the base, single control, sequential and dual control modules is preassembled independently of the other modules; and wherein the base module and said two specific modules are designed so that the base module can be assembled indifferently to any of said two specific modules.

One of the ideas at the base of the invention is to use a modular design of the thermostatic cartridges to be manufactured. Thus, the base module belonging to the manufacturing assembly according to the invention is designed to be shared by at least two, or even three of the different considered types of cartridge, i.e., the single control type, the sequential type and the dual control type. This base module incorporates the thermostatic adjustment of the cartridge and thus forms a preassembled base to which it is possible indifferently to assemble any one of the specific preassembled modules belonging to the manufacturing assembly according to the invention, in order to manufacture a functional thermostatic cartridge. Each of the specific modules incorporates the adjustment of the cold fluid and hot fluid flow rates sent to the base of the base module, the embodiment of the member performing this adjustment not being limiting with respect to the invention and also being able to vary from one specific module to the other. The specific modules differ from one another by how the flow rate and temperature are controlled of the mixture that will leave the base module in the assembled state of the manufactured cartridge, thus distinguishing the single control, sequential and dual control modules as defined above. The invention is thus comparable to an "assembly platform" concept owing to which it is possible to manufacture different types of cartridge, which all have a part of their cartridge that is identical between the different types and that corresponds to the base module, but that differ by a specific part corresponding to each of the specific single control, sequential and dual control modules. Since the base module incorporates the thermostatic adjustment function, which is the most complicated to design and which is the most susceptible to changes, the technical and financial investments that are necessary to provide two, or even three of the specific modules, while guaranteeing the assembly compatibility of the latter with the base module, are substantially lower than the investments that would be necessary to produce the same types of cartridges designed separately from one another.

According to additional advantageous features of the manufacturing assembly according to the invention:

The assembly comprises both the single control module, the sequential module and the dual control module, and in that the base, single control, sequential and dual control modules are designed so that the base module can be assembled indifferently to the single control module, the specific module or the dual control module.

The thermostatic actuator comprises a thermostatic element including:

a piston that forms said dedicated part of the thermostatic actuator, and a body, which contains a thermo-expansive material, which is at least partially arranged in the chamber and which is connected to the slide valve so as to move the slide valve parallel to the main axis, the piston and the body being movable relative to one another parallel to the main axis under the effect of the expansion of the thermo-expansive material.

The thermostatic actuator consists of a thermostatic element including:

a piston that forms said dedicated part of the thermostatic actuator, and a body, which contains a thermo-expansive material, which is at least partially arranged in the chamber and which is connected to the slide valve so as to move it parallel to the main axis, the piston and the body being movable relative to one another parallel to the main axis under the effect of the expansion of the thermo-expansive material.

The thermostatic actuator comprises an element having a shape memory in function of temperature.

The thermostatic actuator consists of an element having a shape memory in function of temperature.

The element is a shape memory spring.

The control mechanism of each of the single control, sequential and dual control modules includes:

a screw and a nut, which are screwed together and which, when the case of the corresponding specific module is fastened to the base of the base module, are substantially centered on the main axis, one from among said screw and said nut being connected in rotation around the axis to the case when the other is rotating around said axis relative to the case, and a rod, which, when the case of the corresponding specific module is fastened to the base, is substantially centered on the main axis and connects the screw to the dedicated part of the thermostatic actuator so as to move said dedicated part axially by driving via the screw.

The screw and the rod are identical between the single control, sequential and dual control modules.

The rod has a first axial end, which is pressed axially against the dedicated part of the thermostatic actuator, and a second axial end, which is opposite the first axial end and which bears axially against the screw with an interposed overtravel spring.

The control mechanism of the single control module includes a single lever for controlling the flow rate and temperature of the mixture, the single lever being mounted relative to the case of the single control module movably both in rotation around the main axis and tilting around a secondary axis, perpendicular to the main axis, when the case is fastened to the base of the base module, the control mechanism of the sequential module includes a single ring for controlling the flow rate and temperature of the mixture, the single ring being mounted relative to the case of the sequential module movably exclusively in rotation around the main axis, and the control mechanism of the dual control module includes a first ring for controlling the flow rate of the mixture and a second ring for controlling temperature of the mixture, the first and second rings being separate from one another and being mounted relative to the case of the dual control module movably exclusively in rotation around the main axis.

Figure 5:
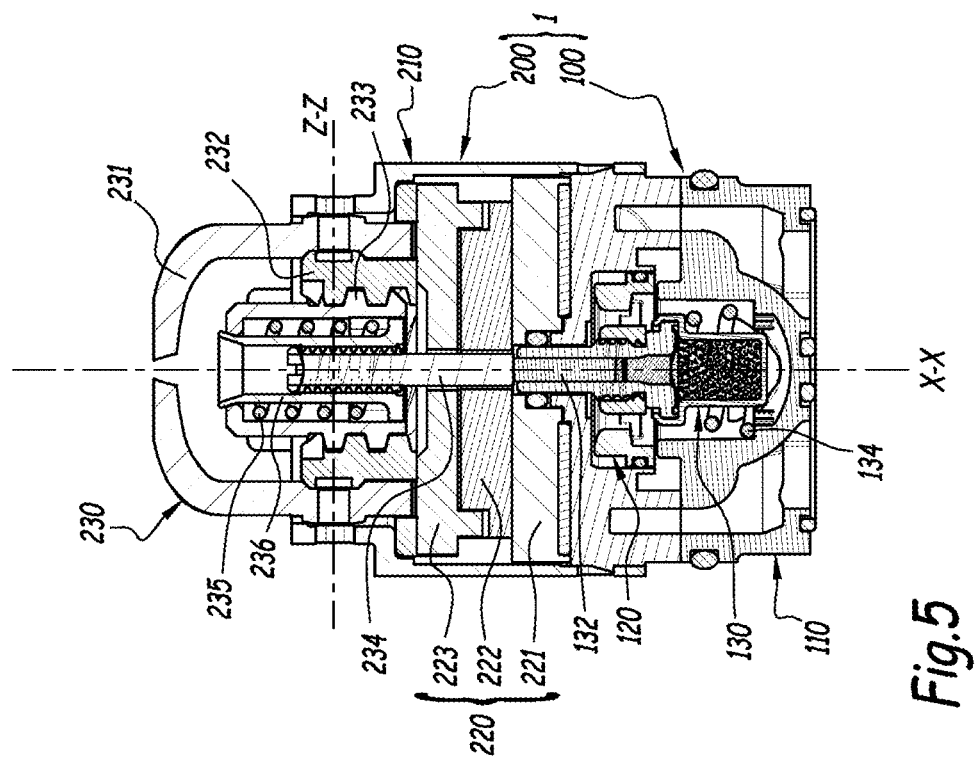
FIGS. 4 and 5 are views similar to FIGS. 2 and 3 and illustrate the assembly of the base module with a specific module of the assembly of FIG. 1.
Figure 4:
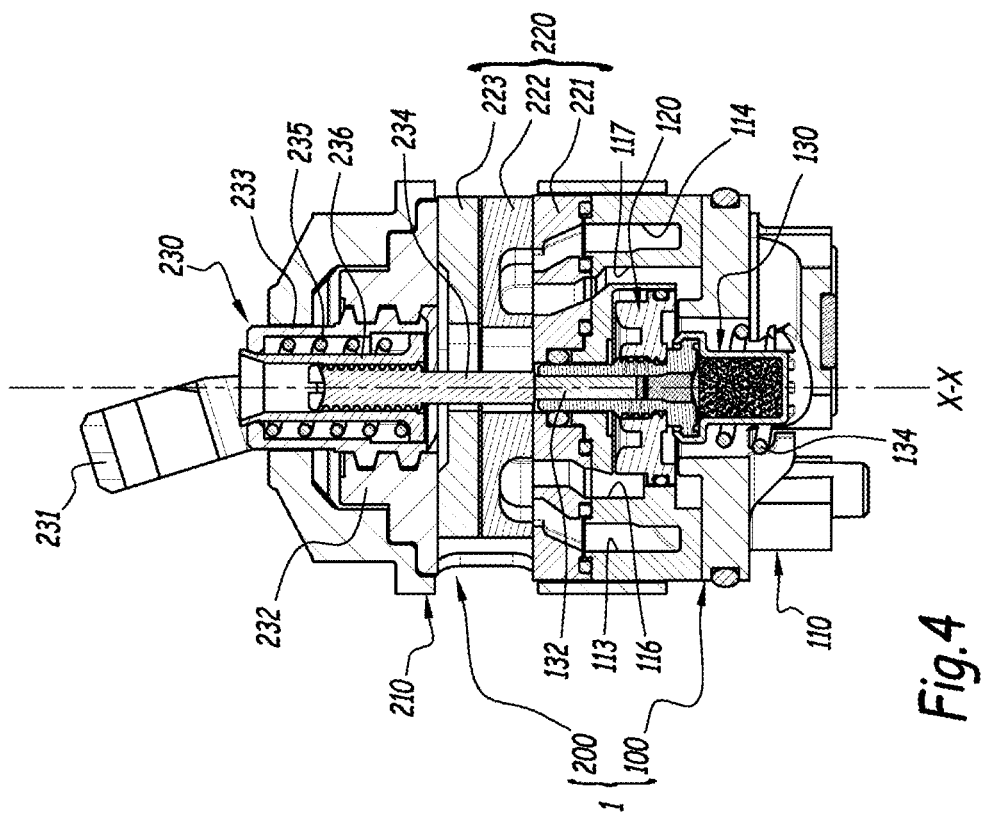
Figure 7:
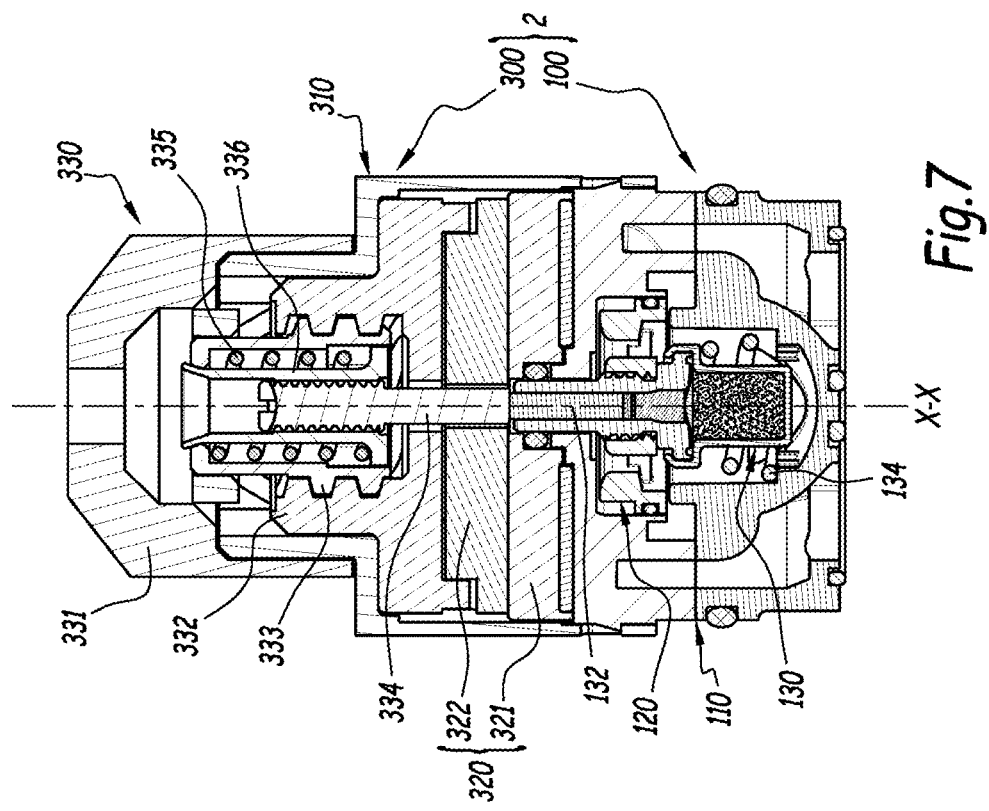
Figure 6:
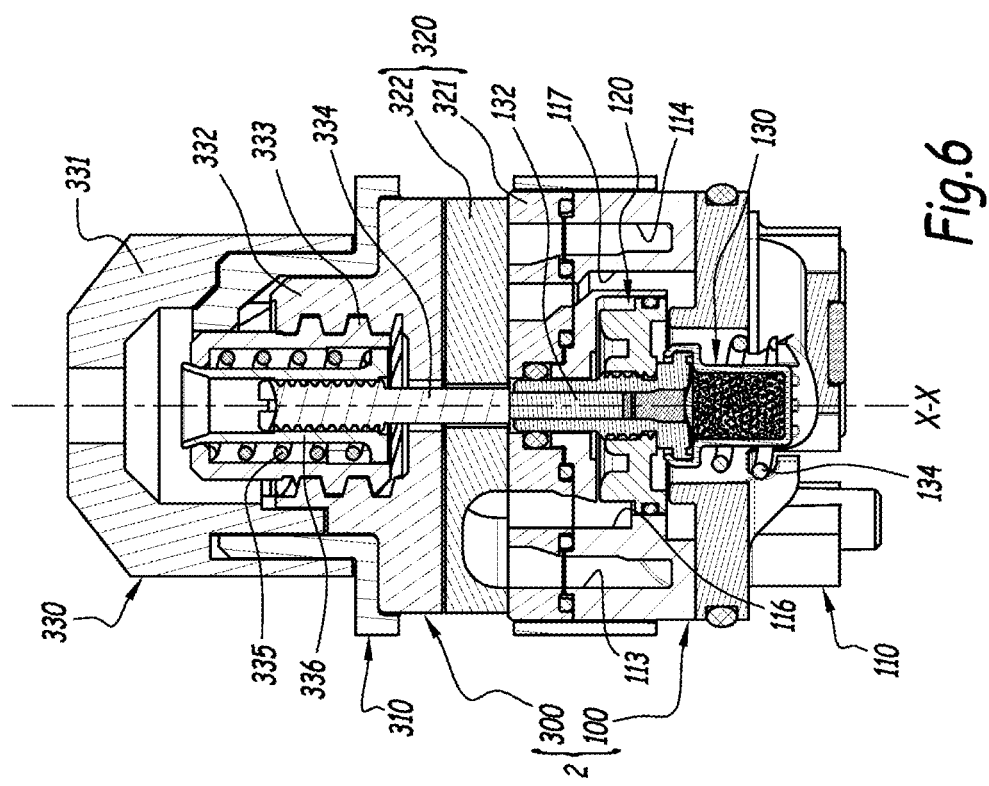

FIG. 1 shows an assembly making it possible to manufacture three different thermostatic cartridges, i.e., a single control cartridge 1, shown in FIGS. 4 and 5, a sequential cartridge 2, shown in FIGS. 6 and 7, and a dual control cartridge 3 shown in FIGS. 8 and 9. Each of said cartridges 1, 2 and 3 is suitable for equipping a faucet mixing hot water and cold water, not shown as such in the figures, or more generally, for equipping a sanitation facility.

The manufacturing assembly of FIG. 1 includes a base module 100 and three specific modules, i.e., a single control module 200, a sequential module 300 and a dual control module 400. The base module 100, which is shown alone in FIGS. 2 and 3, is arranged along a main axis X-X. The modules 100 and 200 are designed to be assembled together, centered on the axis X-X, and thus to form the single control cartridge 1. The modules 100 and 300 are designed to be assembled together, centered on the axis X-X, and thus to form the sequential cartridge 2. The modules 100 and 400 are designed to be assembled together, centered on the axis X-X, and thus to form the dual control cartridge 3.

For convenience, the rest of the description is oriented relative to the axis X-X, considering that the terms "upper", "top" and the like correspond to an axial direction turned toward the upper part of the figures, while the terms "lower", "bottom" and the like correspond to an axial direction in the opposite sense. Thus, within the single control cartridge 1, the single control module 200 is arranged above the base module 100. The same is true for the sequential 300 and dual control 400 modules within the sequential 2 and dual control 3 cartridges, respectively.

As clearly shown in FIGS. 2 and 3, the base module 100 includes a base 110 having a generally cylindrical outer shape, centered on the axis X-X. In the example embodiment considered here, the base 110 primarily includes two separate parts that are arranged one above the other along the axis X-X, i.e., an upper part 111 and a lower part 112. These parts 111 and 112 are axially superimposed so as to be fixed on one another, forming a junction interface between them that extends transversely to the axis X-X. This junction interface is provided to be sealed in that the material contact zones between the upper 111 and lower 112 parts are sealed, prohibiting the passage of fluid through these contact zones. In practice, one possibility for sealing the interface is to attach a flat seal, gripped axially between the parts 111 and 112. Another solution, which limits the size of the base 110 in the direction of the axis X-X, is that this sealing is done by a material connection between the base parts 111 and 112, in particular by glue, or preferably by welding, for example obtained by laser welding.

As shown in FIG. 1 and as clearly visible in FIGS. 2 and 3, the base 110 is provided with a channel 113 for circulating hot water between its lower surface 110A and its upper surface 110B, this channel 113 successively being delimited by the parts 111 and 112 and passing through the junction interface between said parts. Likewise, the base 110 is provided with a channel 114 for circulating hot water between its surfaces 110A and 110B, said channel 114 successively being delimited by the upper 111 and lower 112 parts and passing through the junction interface between its parts.

As clearly shown in FIGS. 2 and 3, the base 110 contains a chamber 115 that is passed through by the axis X-X. In the example embodiment considered in the figures, this chamber 115 is centered on the axis X-X and is made up of free inner spaces, respectively delimited by the upper 111 and lower 112 parts, the chamber 115 extending on either side of the junction interface between said parts 111 and 112.

On either side and separately from the chamber 115, the base 110 is provided with a cold water inlet 116 and a hot water inlet 117, which, at their upper end, each open out on the upper surface 110A of the base 110, while at their lower end, said inlets 116 and 117 open out into the chamber 115, the lower end of the inlet 117 being located axially lower than that of the inlet 116, as shown in FIG. 2. Thus, the inlets 116 and 117 connect the chamber 115 to the outside of the base 110, more specifically to the upper surface 110A of said base. In the example embodiment considered in the figures, the inlets 116 and 117 are delimited exclusively by the upper part 111.

The base 110 is also provided with a mixing outlet 118, which, at its upper end, opens out into the chamber 115, while at its lower end, said outlet 118 opens out onto the lower surface 110B of the base 110. The outlet 118 thus connects the chamber 115 to the outside of the base 110, more specifically to the lower surface 110B of the latter. In the example embodiment considered in the figures, the outlet 118 is delimited exclusively by the lower part 112, while being substantially centered on the axis X-X, as clearly visible in FIG. 2.

During use, in particular when the base module 100 is assembled to any of the specific modules 200, 300 and 400, the circulation channels 113 and 114 are provided to be supplied with cold water and hot water, respectively, from the lower surface 110B of the base 110, as indicated by arrows F1 and C1 in FIG. 3. After having left the base 110 via its upper surface 110A and, as mentioned in more detail hereinafter, after having circulated inside the specific module 200, 300 or 400 with which the base module 100 is assembled, this cold water and this hot water are returned, from the aforementioned specific module, toward the upper surface 110A of the base 110 so as to supply the inlets 116 and 117, respectively, as indicated by the arrows F2 and C2 in FIG. 2. This cold water and hot water, circulating downward in the inlets 116 and 117, respectively, next supply the chamber 115, in which they mix in the form of mixed water, called mixture hereinafter, which, as indicated by the arrows M in FIG. 2, leaves the chamber 115 via the outlet 118, while being discharged downward.

The base module 100 also includes a slide valve 120 which, as clearly shown in FIGS. 2 and 3, has a generally tubular shape, centered on an axis which, in the assembled state of the base module 100, is parallel to or even combined with the axis X-X.

The slide valve 120 is mounted on the base 110, more specifically inside the chamber 115 of the latter, movable parallel to the axis X-X between two extreme positions, i.e.:
- an extreme upper position, in which the upper surface of the slide valve 120 bears against an upper seat, which is stationary relative to the base 110 and which is, for example, defined by the upper part 111 of the base, and
- an extreme lower position, in which the lower surface of the slide valve 120 bears against a lower seat, which is stationary relative to the base 110 and which is, for example, defined by the lower part 112 of said base.

The total axial dimension of the slide valve 120, separating its upper and lower surfaces from one another, is smaller than the axial distance separating the aforementioned upper and lower seats from one another. Consequently, when the slide valve 120 is in its extreme low position, the slide valve closes off a hot water intake inside the chamber 115, by bearing of the slide valve against the lower seat, while maximally opening a cold water passage F3 that is axially delimited between the slide valve and the upper seat and that allows the cold water to pass from the inlet 116 to the chamber 115. Conversely, when the slide valve is in its extreme high position, the slide valve 120 closes off a cold water intake inside the chamber 115, by axial bearing of the slide valve against the upper seat, while maximally opening a hot water passage C3 that is axially delimited between the slide valve and the lower seat and that allows the hot water to pass from the inlet 117 to the chamber 115. During use, the passage F3 is supplied with cold water through the inlet 116 and the passage C3 is supplied with hot water through the inlet 117: depending on the axial position of the slide valve 120 between its extreme upper and lower positions, the respective flow sections of the cold water passage F3 and the hot water passage C3 vary inversely, which means that the quantities of cold water and hot water allowed in the chamber 115 are controlled, in inverse respective proportions, by the slide valve 120 depending on its axial position. In FIGS. 2 and 3, the slide valve 120 occupies an intermediate axial position between its upper and lower extreme positions.

In practice, to provide the guiding of the movable assembly of the slide valve 120 in the chamber 115, the side surface of said slide valve is received in a substantially fitted and sealed manner inside a complementary surface of the chamber 115, with interposition of a sealing gasket to prevent any mixing between the cold water and the hot water upstream from the slide valve. Furthermore, in order for the cold water allowed in the chamber 115 from the inlet 116 to be able to reach and mix with the hot water allowed inside said chamber from the inlet 117, then forming the aforementioned mixture flowing, downstream from the slide valve, to the outlet 118, the slide valve 120 inwardly delimits one or more flow passages, which connect its upper and lower surfaces to one another, some of which are visible in FIG. 3. The embodiment of the developments described in this paragraph is not limiting with respect to the invention.

To drive the axial movement of the slide valve 120 and thus control its axial position, the base module 100 also includes a thermostatic element 130 comprising a body 131 and a piston 132. The body 131 contains a thermo-expansive material 133, which, by expanding, causes the relative translation of the piston 132. The body 131 and the piston 132 are centered on the corresponding axis of translation, this axis of translation being parallel to, or even combined with, the axis X-X in the assembled state of the base 110. Also in the assembled state of the base 110, the body 131 is fixedly secured to the slide valve 120, using any appropriate means, such that at least part of the body 131 is arranged in the chamber 115 and the thermo-expansive material 133 can be activated by the heat from the mixture flowing downstream from the slide valve 120 along the body 131.

The thermostatic element 130 is further associated with a compressed return spring 134 that acts on the body 131 of the thermostatic element 130, and therefore on the slide valve 120 secured to the body 131, opposite the deployment of the piston 132 outside the body 131, resulting from an expansion of the thermo-expansive material 133. The return spring 134 is axially interposed between the base 110 and the slide valve 120, more specifically, in the example embodiment considered here, between the lower part 112 of the base and the body 131 of the thermostatic element: during a contraction of the thermo-expansive material 133, the spring 134 partially relaxes and returns the piston 132 to the inside of the body 131.

As shown in FIGS. 1, 4 and 5, the specific single control module 200 includes a case 210 having a generally cylindrical outer shape, while being centered on a geometric axis which, when the module 200 is assembled to the base module 100, is substantially combined with the axis X-X. Irrespective of its embodiment, the case 210 is designed to be fixedly secured to the base 110 of the base module 100, the case 210 and the base 110 being shown not fastened to one another in FIG. 1, whereas they are fastened to one another in FIGS. 4 and 5. The respective developments of the case 210 and the base 110, allowing the relative fastening thereof, are not limiting with respect to the invention: in the example embodiment considered in the figures, these respective developments cooperate by complementary shapes, in particular by fitting, clipping, adjustment, etc. Irrespective of the embodiment of these developments, the latter are suitable, due to their design, for positioning the module 200 relative to the base 110 in a predetermined manner, in particular relative to the axis X-X, both in the direction of this axis and transversely to this axis, and angularly around this axis. In other words, once the case 210 is fastened to the base 110, in other words in the assembled state of the single control cartridge 1, the single control module 200 occupies a relative position with respect to the base module 100 that is predetermined to provide the overall operation of the cartridge 1.

As clearly shown in FIGS. 4 and 5, the single control module 200 includes an adjusting member 220 arranged inside the case 210. When the base 110 and the case 210 are assembled together, this adjusting member 220 makes it possible, inside the case 210, on the one hand to channel the cold water leaving the channel 113 up to the inlet 116, and on the other hand to channel the hot water leaving the channel 114 up to the inlet 117, while adjustably controlling the cold water flow rate sent to the inlet 116 and the hot water flow rate sent to the inlet 117. In the example embodiment considered in the figures, the adjusting member 220 is made up of superimposed ceramic discs, i.e., a lower disc 221, which is stationary relative to the case 210, and intermediate 222 and upper 223 discs, which are secured together and which, relative to the case 210, are both rotatable around the axis X-X and in translation in a geometric plane perpendicular to this axis: as clearly shown in FIG. 4, the lower disc 221 is passed through by uptakes and down feeds, for the hot water and cold water, respectively, while the lower surface of the intermediate disc 222 is hollowed out to place the uptakes and down feeds for the cold water in communication and to place the uptakes and down feeds for the hot water in communication, such that by modifying the relative positioning of the discs 221 and 222, the cold water flow rate and hot water flow rate exiting toward the bottom of the disc 221 are varied in a controlled manner. Embodiments other than the assembly made up of the discs 221, 222 and 223 can be considered for the adjusting member 220; as an example, WO 2010/072966 proposes an alternative embodiment. More generally, any form of adjusting member, whether with discs or other elements, can be used in the single control module 200, as long as this adjusting member is mounted in the case 210 at least partially movably in order, in the assembled state of the cartridge 1, to vary the cold water flow rate sent to the inlet 116 of the base 110 of the base module 100 and the hot water flow rate sent to the inlet 117 of said base.

The single control module 200 further includes a control mechanism 230, which, when said module 200 is assembled to the base module 100, makes it possible to control the flow rate and the temperature jointly of the mixture leaving the base 110 through the outlet 118.

As clearly shown in FIGS. 1, 4 and 5, the control mechanism 230 comprises a lever 231: when a user of the cartridge 1 drives the lever 231, the flow rate and temperature of the mixture leaving this cartridge are systematically jointly controlled. To that end, the lever 231 is mounted relative to the case 210 movably both in rotation around the axis X-X and tilting around an axis Z-Z extending perpendicular to the axis X-X. In the embodiment considered in FIGS. 4 and 5, the lever 231 has a fork shape turned downward, the two lower arms of which are mounted on a nut 232 of the control mechanism 230, this nut being arranged inside the case 210 while being mounted rotating around the axis X-X relative to this case. The mounting of the lever 231 on the nut 232 is designed to connect the lever 231 and the nut 232 in rotation around the axis X-X, while allowing the lever 231 to tilt relative to the nut 232 around the axis Z-Z. By tilting of the lever 231 around the axis Z-Z, this lever drives the movement of the adjusting member 220 relative to the case 210 so as to modify the flow rate of the mixture made up of the cold water and the hot water sent by this adjusting member 220 to the inlet 116 and the inlet 117, respectively, without significantly altering the respective proportions of cold water and hot water in this mixture: in the example embodiment considered in the figures, the lower end of the arms of the fork formed by the lever 231 is mechanically engaged with the upper disc 223 such that the tilting of the lever 231 around the axis Z-Z drives a translation of the upper disc 223, and thus of the intermediate disc 222 relative to the lower disc 221. Furthermore, by rotating the lever 231 around the axis X-X, this lever drives the nut 232 in a corresponding rotating movement, the lever and/or the nut then actuating the adjusting member 220 by driving so as to increase one of the cold water and hot water flow rates respectively sent to the inlets 116 and 117 by this adjusting member 220, relative to the other of these flow rates: in the example embodiment considered in the figures, the rotation of the lever 231 drives the corresponding rotation of the upper disc 223, and thus of the intermediate disc 222 relative to the lower disc 221.

Of course, in particular based on the embodiment of the adjusting member 220, embodiments other than that described thus far can be considered for the part of the control mechanism 230 making it possible to actuate this adjusting member by driving.

Furthermore, in order to actuate the piston 132 of the thermostatic element 130 of the base module 100 by driving, when said base module and the single control module 200 are assembled together, the control module 230 comprises a screw 233 that is screwed coaxially inside the nut 232, as clearly shown in FIGS. 4 and 5. The nut 232 and the screw 233 together form a "screw-nut" system that mechanically converts a rotating movement around the axis X-X of one of the two into a translational movement of the other along said axis, as long as the latter is blocked in rotation around the axis X-X. In the assembled state of the single control module 200, it is the screw 233 that is connected to the case 210 in rotation around the axis X-X: it is understood that a rotational action around the axis X-X of the nut 232 relative to the case 210 drives a translation of the screw 233 along the axis X-X. Furthermore, in order to transmit this translational movement to the piston 132 of the thermostatic element 130 when the single control module 200 is assembled to the base module 100, the mechanism 230 also comprises a rod 234, which, in the assembled state of the single control cartridge 1, is centered on the axis X-X and connects the screw 233 to the piston 132 of the thermostatic element 130 so as to move this piston 132 axially by driving by this screw. As shown in FIGS. 4 and 5, the rod 234 extends in the upward axial extension of the piston 132 such that on the one hand, under the upward thrust effect of the return spring 134, the piston 132 is pressed axially against the lower end of the rod 234, and on the other hand, under normal usage conditions of the cartridge 1, the upper end of the rod 234 is rigidly connected to the screw 233. It is understood that under normal usage conditions, the screw 233 and the rod 234 determine the axial altitude of the piston 132 relative to the case 210, independently of the relative position of this piston 132 with respect to the body 131 of the thermostatic element 130.

Thus, when the lever 231 is rotated around the axis X-X, the corresponding rotation of the nut 232, in addition to moving the adjusting member 220 previously explained, drives the translation of the screw 233, the rod 234 and the piston 132 along the axis X-X. In practice, the pitch of the screw-nut system formed by the nut 232 and the screw 233 is suitable for allowing both the adjustment of the temperature of the mixture by the adjusting member 220 and the corrective regulation of said temperature by the slide valve 120, the position of which is controlled by the thermostatic element 130 so as to impose a desired control temperature on the mixture, which is for example identified by a graduated ring, not shown in the figures, attached on the outer surface of the case 210. In other words, this control temperature, which is defined by the axial position of the piston 132 controlled by the screw 233 and the rod 234, corresponds to a regulating position for the slide valve 120 inside the chamber 115, this regulating position being controlled by the thermostatic element 130.

As explained thus far, the mechanism 230 is therefore designed, in the assembled state of the single control cartridge 1, to control the flow rate and temperature of the mixture leaving the cartridge jointly exclusively by driving the single lever 231 provided to actuate, by driving, the control member 220 and the piston 132 of the thermostatic element 130 permanently together.

According to one optional advantageous arrangement, which is implemented for the single control member 200 considered in FIGS. 4 and 5, the control mechanism 230 also includes an overtravel spring 235, which, in the assembled state of the single control member 200, is inserted, while being compressed, axially between the screw 233 and the rod 234. This overtravel screw 235 has a greater stiffness than that of the return spring 134, typically a stiffness twice that of the return spring 134, such that in the assembled state of the single control cartridge 1, when the latter is under normal usage conditions, in other words when the slide valve 120 is movable inside the chamber 115 freely, i.e., without axially abutting against a resistant surface, the overtravel spring 235 rigidly transmits the axial forces between the rod 234 and the screw 233, whereas, in case of overtravel of the piston 132 while the slide valve 120 axially abuts against a resistant surface, preventing it from accommodating said overtravel of the piston, the overtravel spring 235 handles accommodating the overtravel of the piston 132, by compressing further under the action of the rod 234, which in turn is driven axially by the piston 132. In this way, one avoids damaging the slide valve 120 and/or the thermostatic element 130, typically when the body 131 of the latter is activated by a mixture having an overly high temperature, as is the case when the cold water supplying the cartridge is cut off significantly or completely, in other words outside normal usage conditions for this cartridge. With respect to the user, the overtravel spring 235 gives the single control cartridge 1 a burn protection function.

In the embodiment considered in FIGS. 4 and 5, the overtravel spring 235 is advantageously housed inside the screw 233, while being mounted compressed between an inner shoulder of this screw and a bush 236 allowing a fine adjustment of the angular indexing around the axis X-X of the lever 231 with respect to the control temperature for the thermostatic regulation by the slide valve 120. This bush 236 is screwed to the upper end of the rod 234, while being mounted relative to the screw 233, in particular inside the latter, so as both to be connected in rotation to said screw 233 around the axis X-X and to be movable relative to the screw 233 around said axis X-X. It will be understood that, in the assembled state of the single control cartridge 1 and even while the handle 231 is kept fixed in rotation around the axis X-X relative to the case 210, the screw-nut system formed by the nut 232 and the screw 233 is immobilized, while leaving the possibility of modifying the axial position of the rod 234 and therefore that of the thermostatic element 130, subject to setting the rod 234 in rotation on itself around the axis X-X relative to the bush 236 kept fixed in rotation by the screw 233, in other words, subject to the screwing-unscrewing of the rod 234 inside the bush 236. Thus, for a given angular position of the lever 231 relative to the case 210, typically for a predetermined angular position of this lever that is associated in a predetermined manner with a preset control temperature value, the setting in rotation of the rod 234 inside the bush 236 modifies the axial altitude of the piston 132 of the thermostatic element 130, which allows a fine adjustment of said axial altitude of the piston. In practice, this fine adjustment is done on a dedicated bench or a similar facility, owing to which water is circulated through the cartridge having an imposed known temperature, which is used as the temperature reference to set the position of the thermostatic element 130 along the axis X-X.

As mentioned above, the single control cartridge 1 is manufactured by assembling the base module 100 and the specific single control module 200 together, having stressed that, as illustrated by FIG. 1, the base module 100 is preassembled independently of the single control module 200 and said single control module 200 is preassembled independently of the base module 100. In other words, the base module 100 is obtained by assembling the base 110, the slide valve 120 and the thermostatic element 130 together, independently of obtaining the single control module 200 by assembling the case 210, the adjusting member 220 and the control mechanism 230 together. In order to obtain the single control cartridge 1, the base module 100, in the preassembled state, and the single control module 200, in the preassembled state, are subsequently assembled together, subject to fastening the base 110 and the case 210 together, said fastening leading to functionally arranging the slide valve 120, the thermostatic element 130, the adjusting member 220 and the control mechanism 230 relative to one another like in FIGS. 4 and 5.

Regarding the specific sequential module 300, shown in FIGS. 6 and 7 in its state assembled with the base module 100 in order to form the sequential cartridge 2, said module 300 comprises, similarly to the single control module 200, a case 310, an adjusting member 320 and a control mechanism 330. Before describing said case 310, adjusting member 320 and control mechanism 330 in detail, it will be noted that the sequential module 300 differs from the other specific modules 200 and 400 by the way in which said module 300 controls the flow rate and the temperature of the mixture leaving the base module 100 when the latter is assembled to the module 300: indeed, the sequential module 300 is provided to control the flow rate, then the temperature of this mixture successively, as explained hereinafter.

More specifically, the case 310 is functionally similar to the case 210, in that the case 310 is suitable for being fastened to the base 110 of the base module 100 for the assembly between the modules 100 and 300. In particular, the case 310 has arrangements that are functionally, or even structurally similar to those of the case 210, allowing the module 310 to be fastened to the base 110 with a predetermined relative positioning between the modules 100 and 300. However, due to the specificity of the module 300 compared to the other specific modules 200 and 400, the case 310 has a specific part, which differs from the corresponding part of the case 210.

The adjusting member 320 is functionally similar to the adjusting member 220, in that the adjusting member 320 is mounted in the case 310 at least partially movably so as, in the assembled state of the sequential cartridge 2, to vary the cold water flow rate, sent to the inlet 116 by the adjusting member 220, and the hot water flow rate, sent to the inlet 117 by the adjusting member 220. This being the case, due to the specificity of the module 300 compared to the other specific modules 200 and 400, the adjusting member 320 is structurally different from the adjusting member 220. Thus, in the example shown in FIGS. 6 and 7, the adjusting member 320 comprises a set of two superimposed discs, i.e., a lower disc 321, which is mounted stationary relative to the case 310, and an upper disc 322, which is mounted exclusively rotating around the axis X-X relative to the lower disc 321.

The control mechanism 330 does not have a lever, which would be similar to the lever 231, in favor of a single ring 331 that is mounted relative to the case 310 exclusively rotating around the axis X-X. This ring 331 is connected in rotation to a nut 332 of the mechanism 330, inside which a groove 333 is screwed that is connected in rotation around the axis X-X of the case 310. Similarly to the screw 233, the screw 333 is, in the assembled state of the sequential cartridge 2, connected to the piston 132 of the thermostatic element 130 by a rod 334, with the insertion of an overtravel spring 335 mounted axially between the screw 333 and a fine adjustment bush 336, functionally similar to the bush 236. The spring 335 differs from the spring 235 in that it does not provide a rigid transmission of movement between the screw 333 and the rod 334 over the entire translational travel of this screw 333, in other words over the entire rotational travel of the nut 332 and the ring 331 connected in rotation to the latter. More specifically, over a first part of the rotational travel of the ring 331, corresponding to the rotational driving of this ring between an extreme position, associated with the complete closure of the cold water and hot water intake into the inlets 116 and 117 of the base 110, and an intermediate position, between which the ring 331 controls, via the nut 332, the adjusting member 320 so that the latter keeps the hot water flow rate sent to the inlet 117 nil while varying only the cold water flow rate sent to the inlet 116 up to a maximum of this cold water flow rate when the ring 331 is in the aforementioned intermediate position, the spring 335 does not transmit the translational movement of the screw 333 to the rod 334, while accommodating said translational movement subject to its compression; then, over a second part of the rotational travel of the ring 331, corresponding to the driving of said ring past the aforementioned intermediate position, the ring 331 controls, via the nut 332, the adjusting member 320 so that the latter varies both the cold water flow rate sent to the inlet 116 and the hot water flow rate sent to the inlet 117 while, at the same time, the spring 335 rigidly transmits the translational movement of the screw 333 to the rod 334. The position of the ring 331 past the aforementioned intermediate position thus controls the temperature of the mixture leaving the sequential cartridge 2, subject to the adjustment of said temperature by the control member 320 and the corrective regulation of said temperature by the slide valve 120, the position of which is controlled by the thermostatic element 130, so as to impose a desired temperature on the mixture, which is for example identified by a graduated ring, not shown in the figures, attached on the outer surface of the case 310. Thus, the control mechanism 330 of the sequential module 300 is suitable for successively controlling the flow rate and the temperature of the mixture by exclusive driving of only the ring 331 provided first to actuate the adjusting member 220 by driving without driving the piston 132 of the thermostatic element 130, then to actuate the adjusting member 320 and the piston 132 together by driving.

According to considerations similar to those explained above for the modules 100 and 200, the specific sequential module 300 is preassembled independently of the base module 100, before being assembled to the base module 100, which in turn is already preassembled, in order to obtain the sequential cartridge 2, whereas its case 310, adjusting member 320 and control mechanism 330 are already preassembled together.

The dual control module 400 in turn has the specificity of being able, when it is assembled to the base module 100, to control the flow rate and the temperature of the mixture leaving the dual control cartridge 3 separately.

The dual control module 400 includes a case 410 and an adjusting member 420 that are functionally similar, or partly structurally similar to the cases 210 or 310 and to the adjusting member 220 or 320, while having specificities related to the ability of the module 400 to control the flow rate and the temperature of the mixture separately.

Likewise, the dual control module 400 includes a control mechanism 430 that, instead of having a single lever like the lever 231 or a single ring like the ring 331, includes two separate rings 431 and 437, which are each mounted relative to the case 410 so as to be movable exclusively in rotation around the axis X-X. The ring 431 is connected in rotation around the axis X-X to a screw 433 of the mechanism 430, screwed to the inside of a nut 432 of this mechanism 430, this nut 432 being connected to the case 410 both in rotation around the axis X-X and in translation along this axis: the rotational driving of the ring 431 drives the screwing-unscrewing of the screw 433 around the axis X-X relative to the case 410. This screwing-unscrewing is transmitted to a rod 434, fixedly screwed to the inside of the screw 433: similarly to the rods 234 and 334, the rod 434 connects the screw 433 to the piston 132 of the thermostatic element 130 so as to move this piston axially by driving by the screw. The ring 437 in turn is rotatably connected to the adjusting member 420, in particular to a moving part of the latter relative to the case 410, such that the rotational driving of the ring 437 actuates the adjusting member 420 by driving such that the latter varies the cold water and hot water flow rates respectively sent to the inlet 116 and the inlet 117 without substantially modifying the relative proportions of cold water and hot water. The mechanism 430 provides for mechanical independence between the rings 431 and 437, such that said mechanism 430 controls the flow rate of the mixture leaving the dual control cartridge 3 separately, by exclusive driving of its ring 437 provided to actuate only the adjusting member 220 by driving, and the temperature of said mixture by exclusive driving of the ring 431 provided to actuate only the piston 132 of the thermostatic element 130 by driving.

Advantageously, the mechanism 430 of the dual control module 400 incorporates an overtravel spring 435 and a bush 436 that are functionally, or even structurally similar to the overtravel spring 235 and the bush 236 of the control mechanism 230.

Again, according to considerations similar to those explained above, the dual control module 400 is preassembled independently of the base module 100: while its case 410, adjusting member 420 and control mechanism 430 are already preassembled together, the module 400 is assembled to the base module 100, which in turn is already preassembled, in order to obtain the dual control cartridge 3.

By having the manufacturing assembly shown in FIG. 1, it is therefore possible to obtain the single control cartridge 1 by assembling the base module 100 with the specific single control module 200, or the sequential cartridge 2 by assembling the base module 100 with the specific sequential module 300, or the dual control cartridge 3 by assembling the base module 100 with the specific dual control module 400. In other words, this manufacturing unit is provided so that the preassembled base module 100 may be assembled indifferently with any of the specific modules 200, 300 and 400, depending on whether the manufacturing need is to obtain the single control cartridge 1, the sequential cartridge 2 or the dual control cartridge 3. As explained in detail in the introductory part of this document, the technical and financial documents are thus lower than those that would be needed to obtain the cartridges 1, 2 and 3 separately.

Of course, alternatively, rather than the manufacturing unit including all three specific modules 200, 300 and 400, only two of said specific modules may be provided within the manufacturing unit.

According to one particularly advantageous aspect, which is implemented in the example embodiment considered in the figures, certain components of the specific modules 200, 300 and 400 are provided to be strictly identical between said specific modules. This is in particular the case for the screws 233, 333 and 433 and for the rods 234, 334 and 434. By sharing the structurally identified individual components in this way, the specific modules 200, 300 and 400 can be less expensive to manufacture.

Lastly, various arrangements and alternatives may also be considered for the manufacturing assembly described thus far. As examples:

within the base module 100, rather than moving the slide valve 120 inside the chamber 115 via the thermostatic element 130, the latter can be replaced by a shape memory element based on the temperature, in particular a shape memory spring; more generally, such a shape memory element and the thermostatic element 130 are only possible embodiments for a thermostatic element that performs the function of moving the slide valve 120 inside the chamber 115 based on the temperature and a dedicated part of which defines, by its axial position, the control temperature at which the slide valve regulates the temperature of the mixture; and/or also within the base module 100, rather than making the base 110 in two parts like the parts 111 and 112 described above, the base 110 can alternatively be made differently, for example in a single part, or like in WO 2014/135614.

What is claimed is:

1. An assembly for manufacturing a cartridge for regulating cold and hot fluids to be mixed, said assembly comprising:
    a base module, comprising:
    a base, which defines a main axis and which contains a chamber for mixing cold and hot fluids, said chamber being connected to the outside of the base by both first and second inlets, for the cold fluid and for the hot fluid, respectively, and an outlet for a mixture of the cold and hot fluids,
    a slide valve that is movable parallel to the main axis inside the chamber so as to vary inversely the respective flow sections of a first passage, supplied by the first inlet, and a second passage, supplied by the second inlet, and
    a thermostatic actuator, which is at least partly arranged in the chamber and which, based on the temperature of the mixture, moves the slide valve inside the chamber up to a regulating position corresponding to a control temperature that is defined by the axial position of a dedicated part of the thermostatic actuator; and
    at least two specific modules from among a single control module, a sequential module and a dual control module, each of said single control, sequential and dual control modules comprising:
    a case that is suitable for being fastened to the base of the base module, and
    an adjusting member that is mounted in the case at least partially movably so as, when the case is fastened to the base, to vary the flow rate of the cold fluid, sent to the first inlet, and the flow rate of the hot fluid, sent to the second inlet,
    the single control module further comprising a control mechanism, which, when its case is fastened to the base, is suitable for jointly controlling the flow rate and the temperature of the mixture by providing for driving its adjusting member and the dedicated part of the thermostatic actuator continuously with one another,
    the sequential module further comprising a control mechanism, which, when its case is fastened to the base, is suitable for successively controlling the flow rate and the temperature of the mixture by first providing for driving its adjusting member without the dedicated part of the thermostatic actuator, then driving its adjusting member and the dedicated part of the thermostatic actuator together, and
    the dual control module further comprising a control mechanism, which, when its case is fastened to the base, is suitable for separately controlling the flow rate and the temperature of the mixture by providing for driving its adjusting member and the dedicated part of the thermostatic actuator independently of one another;
    wherein each of the base, single control, sequential and dual control modules is preassembled independently of the other modules; and
    wherein the base module and said two specific modules are designed so that the base module can be assembled indifferently to any of said two specific modules.

2. The assembly according to claim 1, wherein the assembly comprises both the single control module, the sequential module and the dual control module, and in that the base, single control, sequential and dual control modules are designed so that the base module can be assembled indifferently to the single control module, the specific module or the dual control module.

3. The assembly according to claim 1, wherein the thermostatic actuator comprises a thermostatic element comprising:
    a piston that forms said dedicated part of the thermostatic actuator, and
    a body, which contains a thermo-expansive material, which is at least partially arranged in the chamber and which is connected to the slide valve so as to move the slide valve parallel to the main axis,
    the piston and the body being movable relative to one another parallel to the main axis under the effect of the expansion of the thermo-expansive material.

4. The assembly according to claim 1, wherein the thermostatic actuator consists of a thermostatic element comprising:
    a piston that forms said dedicated part of the thermostatic actuator, and
    a body, which contains a thermo-expansive material, which is at least partially arranged in the chamber and which is connected to the slide valve so as to move it parallel to the main axis,
    the piston and the body being movable relative to one another parallel to the main axis under the effect of the expansion of the thermo-expansive material.

5. The assembly according to claim 1, wherein the thermostatic actuator comprises an element having a shape memory in function of temperature.

6. The assembly according to claim 5, wherein the element is a shape memory spring.

7. The assembly according to claim 1, wherein the thermostatic actuator consists of an element having a shape memory in function of temperature.

8. The assembly according to claim 7, wherein the element is a shape memory spring.

9. The assembly according to claim 1, wherein the control mechanism of each of the single control, sequential and dual control modules comprises:
    a screw and a nut, which are screwed together and which, when the case of the corresponding specific module is fastened to the base of the base module, are substantially centered on the main axis, one from among said screw and said nut being connected in rotation around the axis to the case when the other is rotating around said axis relative to the case, and
    a rod, which, when the case of the corresponding specific module is fastened to the base, is substantially centered on the main axis and connects the screw to the dedicated part of the thermostatic actuator so as to move said dedicated part axially by driving via the screw.

10. The assembly according to claim 9, wherein the screw and the rod are identical between the single control, sequential and dual control modules.

11. The assembly according to claim 9, wherein the rod has a first axial end, which is pressed axially against the dedicated part of the thermostatic actuator, and a second axial end, which is opposite the first axial end and which bears axially against the screw with an interposed overtravel spring.

12. The assembly according to claim 1, wherein:
the control mechanism of the single control module comprises a single lever for controlling the flow rate and temperature of the mixture, the single lever being mounted relative to the case of the single control module movably both in rotation around the main axis and tilting around a secondary axis, perpendicular to the main axis, when the case is fastened to the base of the base module, wherein
the control mechanism of the sequential module comprises a single ring for controlling the flow rate and temperature of the mixture, the single ring being mounted relative to the case of the sequential module movably exclusively in rotation around the main axis (X-X), and wherein
the control mechanism of the dual control module comprises a first ring for controlling the flow rate of the mixture and a second ring for controlling temperature of the mixture, the first and second rings being separate from one another and being mounted relative to the case of the dual control module movably exclusively in rotation around the main axis.

* * * * *